(12) United States Patent
Kuronuma et al.

(10) Patent No.: US 6,328,401 B1
(45) Date of Patent: Dec. 11, 2001

(54) PRINTER AND PRINTING CONTROL METHOD

(75) Inventors: Akira Kuronuma; Shinichi Omo; Takayuki Murata; Masahiko Umezawa, all of Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/190,101

(22) Filed: Nov. 12, 1998

(30) Foreign Application Priority Data

Nov. 13, 1997 (JP) .................................................... 9-311984

(51) Int. Cl.[7] .................................................... B41J 2/205
(52) U.S. Cl. .................................................. 347/15; 347/43
(58) Field of Search .................................. 347/5, 12, 14, 347/15, 40, 41, 47, 50, 43; 400/279, 320, 322

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,691,364 * | 9/1987 | Fukuzawa et al. | 382/41 |
| 4,723,129 | 2/1988 | Endo et al. | 347/56 |
| 4,740,796 | 4/1988 | Endo et al. | 347/56 |
| 5,650,858 * | 7/1997 | Lund | 358/298 |
| 5,754,192 * | 5/1998 | Sugaya | 347/15 |

FOREIGN PATENT DOCUMENTS

| | | | |
|---|---|---|---|
| 0533486 | 3/1993 | (EP) . | |
| 0622758 | 11/1994 | (EP) . | |
| 2279199 | 12/1994 | (GB) . | |
| 54-56847 | 5/1979 | (JP) | B41M/5/26 |
| 59-123670 | 7/1984 | (JP) | B41J/3/04 |
| 59-138461 | 8/1984 | (JP) | B41J/3/04 |
| 60-71260 | 4/1985 | (JP) | B41J/3/04 |

\* cited by examiner

*Primary Examiner*—N. Le
*Assistant Examiner*—Lamson D. Nguyen
(74) *Attorney, Agent, or Firm*—Fitzpatrick, Cella, Harper & Scinto (57) ABSTRACT

A printer and printing control method for improving throughput by performing efficient smoothing processing. The printer adopting the method monitors print data while it is transmitted from a receiving buffer 25a to a print buffer 25b, analyses the print data by a unit of one scanning area of a printhead whether the print data causes printing operation of the printhead, and, if no print data which causes printing operation is included in the print data corresponding to the one scanning area, controls to skip execution of row-column conversion and/or smoothing processing.

27 Claims, 8 Drawing Sheets

PRINTER AND PRINTING CONTROL METHOD

BACKGROUND OF THE INVENTION

This invention relates to a printer and printing control method and, more particularly, to a printer and printing control method for performing printing using a printhead, utilizing an ink-jet printing method by discharging ink on a printing medium.

A printer for performing printing in accordance with the ink-jet printing method has a printhead, which discharges ink droplets, and an ink tank which supplies ink to the printhead.

The basic operation of the printhead is explained below with reference to FIG. 5.

Figure 5:
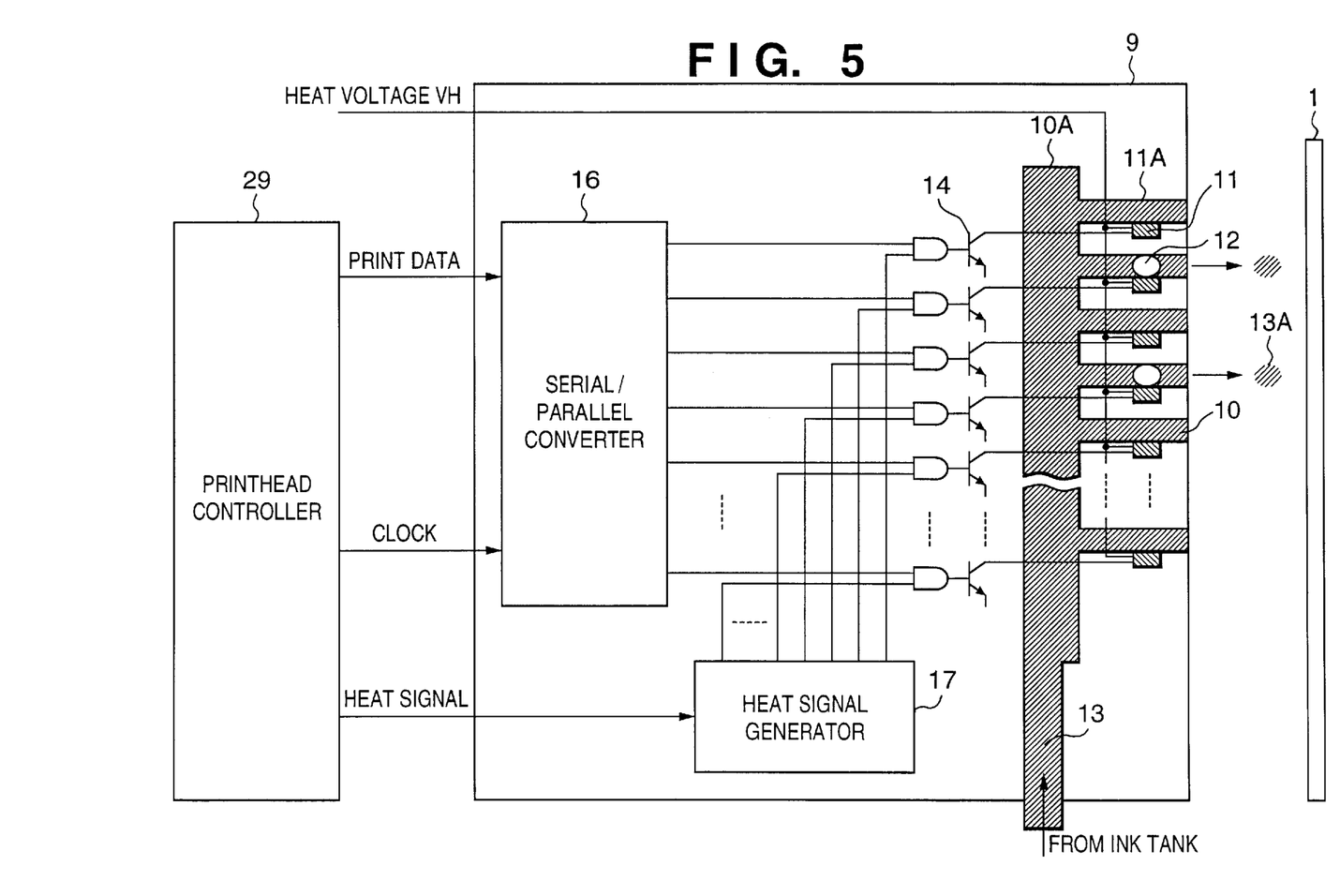
FIG. 5 is a view showing a construction of a printhead.

FIG. 5 is a schematic view showing a configuration of a part of an ink discharge portion of a printhead 9.

Referring to FIG. 5, the printhead 9 which faces to a printing medium 1, such as a recording paper sheet, includes a plurality of ink discharge orifices 10 formed at predetermined intervals in the vertical direction. When printing, each of the electrothermal transducers 11 (e.g., heating resistor) arranged in correspondence with the respective ink discharge orifices 10 is driven (heated by sending electric current) in accordance with inputted printing information, thereby causing ink film boiling, and consequently a bubble 12 is formed in the ink. The pressure of the formed bubble 12 causes ink to be discharged from the ink discharge orifice 10. An ink droplet 13A formed in the ink discharge operation adheres to the printing medium 1, and a predetermined pattern is formed, thereby printing is performed in a dot pattern. Note that the electrothermal transducers 11 (e.g., heating resistor) are applied with a heat voltage (VH) controlled external to the printhead.

Thereafter, when the driving of the electrothermal transducers 11 is stopped, the inside of nozzles 11A of the printhead 9 gradually cools down, and the bubble 12 disappears.

The printhead 9 is equipped with a heat driver 14 for switching on/off electric current to the electrothermal transducers 11, a serial/parallel converter 16 for temporarily storing serially inputted printing information and converting it into parallel data, and a heat signal generator 17 for providing a heat signal to the heat driver 14. Further, a circuit substrate of a printhead controller 29 for providing print data to the serial/parallel converter 16 in synchronization with a clock signal and providing a heat signal to the heat signal generator 17 is installed in a carriage on which the printhead 9 is mounted.

Further, in FIG. 5, reference numeral 10A denotes a common liquid chamber for ink connected to the respective nozzles 11A, and reference numeral 13 denotes a liquid channel from an ink tank to the common liquid chamber 10A.

Next, a conventional row-column conversion will be explained with reference to FIG. 6.

Figure 6A:
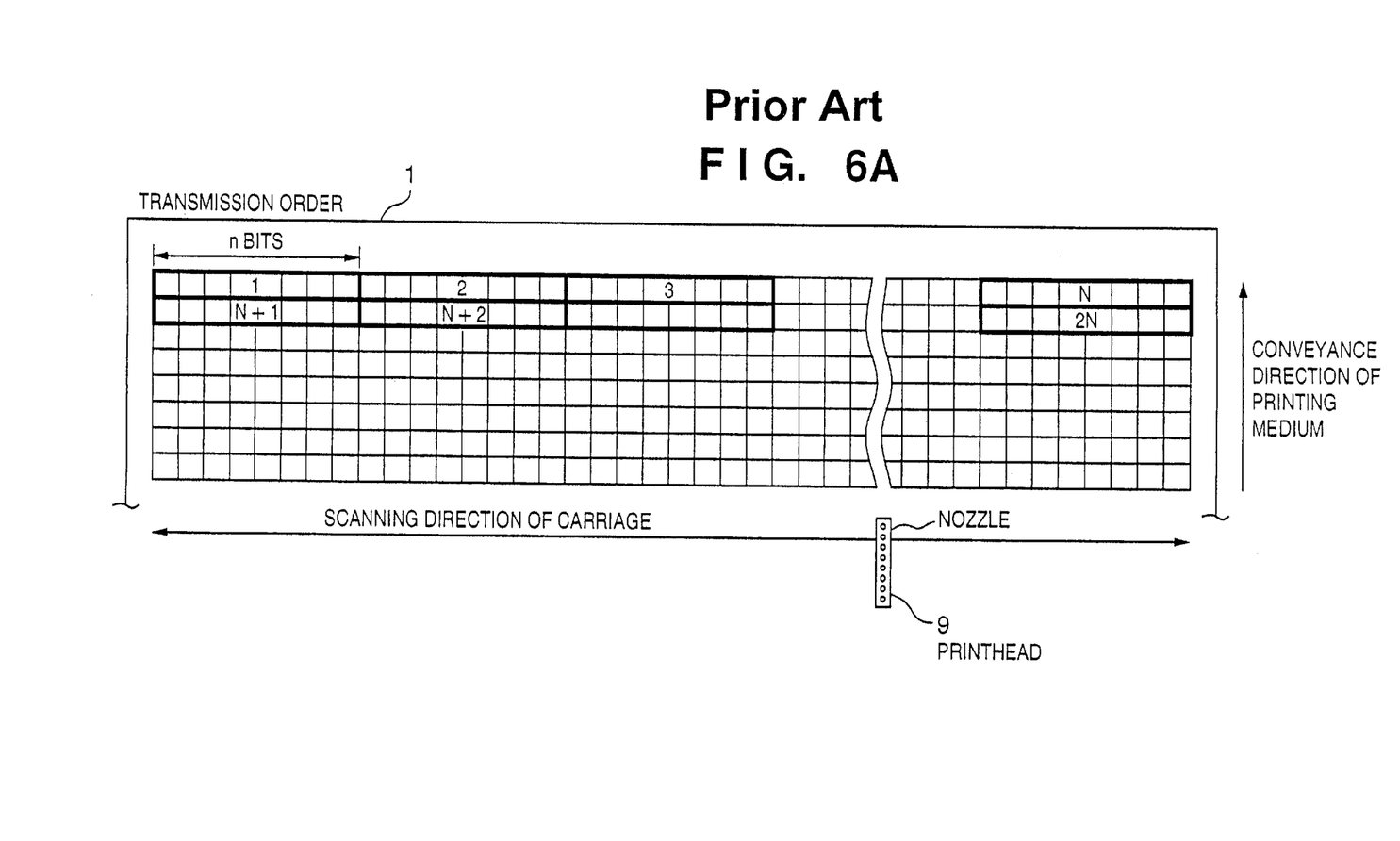
FIGS. 6A and 6B are explanatory views for explaining row-column conversion.
Figure 6B:
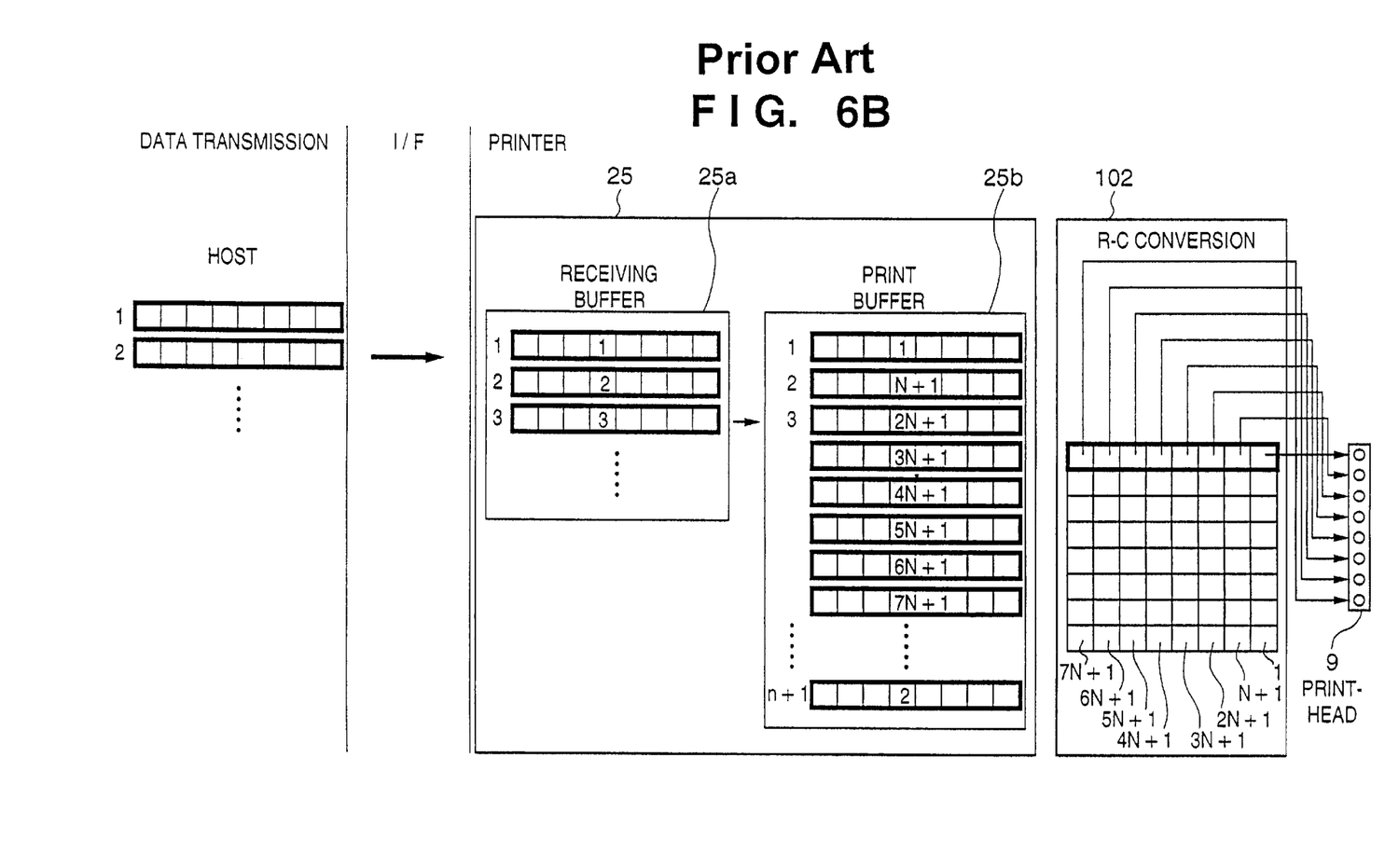

Conventionally, data transmitted from a host computer (referred to as "host" hereinafter) to a printer is divided by n bits (generally, n=8) in the direction perpendicular to the conveyance direction of the printing medium 1 as shown in FIG. 6A. Such data is stored in a receiving buffer 25a provided in RAM 25 of the printer in the received order as shown in FIG. 6B.

The nozzles of the printhead 9 are arranged in the direction parallel to the conveyance direction of the printing medium 1. Therefore, as shown in FIG. 6B, when transmitting the data temporarily stored in the receiving buffer 25a to a print buffer 25b, the data is transmitted by an amount corresponding to n×N-bit addresses at predetermined intervals, thereby divided into blocks of n×n bits. Then, each block of the divided data is rotated 90 degrees in a data processor 102. The above processing is called row-column conversion or H(honrizontal)–V(vertical) conversion (hereinafter referred to as "R-C conversion").

Then, the R-C converted data is transmitted to the printhead 9 in corresponding to the number of nozzles of the printhead via the printhead controller 29.

Next, a conventional smoothing processing will be explained with reference to FIG. 7.

Recently, the resolution of a printer has been increased to improve the quality of a printed image. However, the resolution of data transmitted from a host to the printer is sometimes lower than that of the printer. In such cases, the resolution of print data may be converted to the resolution of the printer in the printer.

Figure 7:
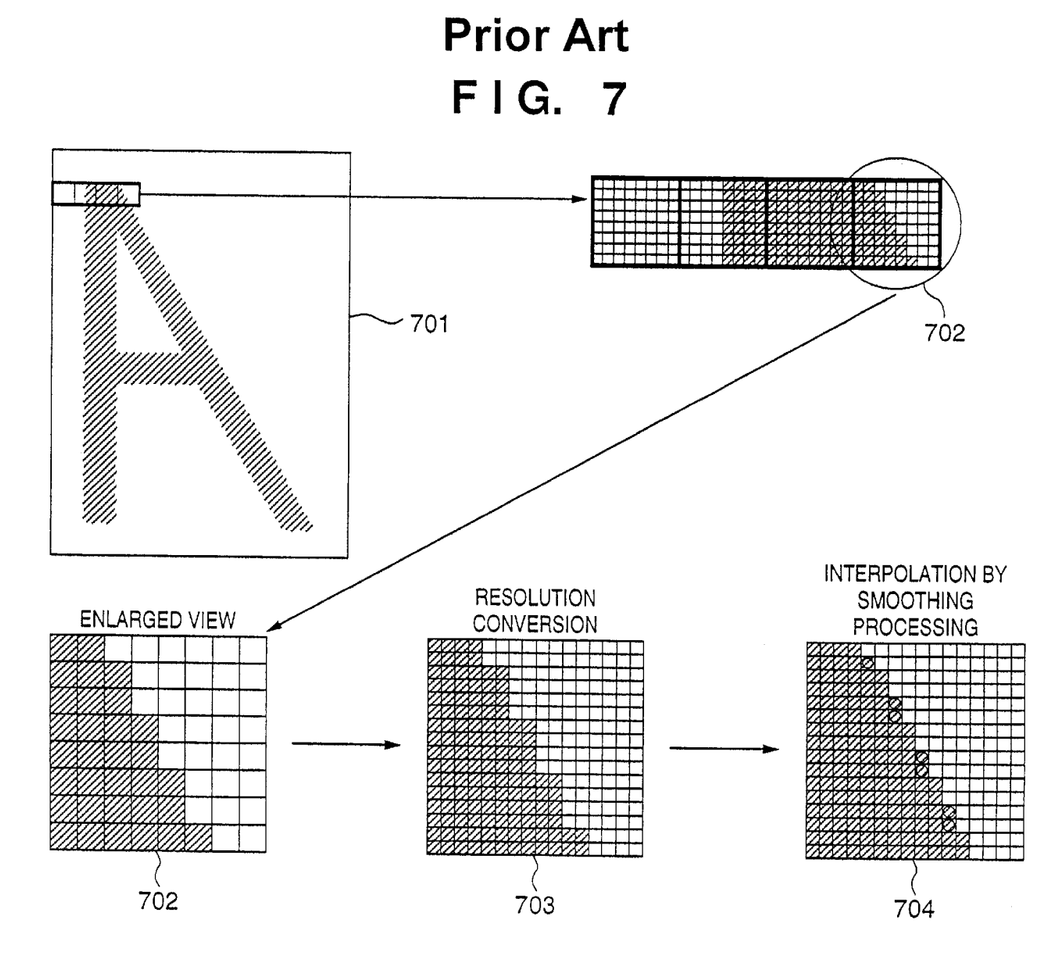
FIG. 7. is an explanatory view for explaining smoothing processing.

For instance, print data which represents a character pattern 701 as shown in FIG. 7 with a resolution of m×m dots per unit area (8×8 dots in 702 of FIG. 7) is converted into a resolution of 2m×2m dots per unit area (16×16 dots in 703 of FIG. 7). However, if the resolution conversion of the print data is simply performed as in the manner shown in 703 of FIG. 7, the quality of a printed image remains the same as that of the print data of the original resolution.

One purpose of representing an image in high resolution is to print smooth curves and smooth slanting lines; therefore, after a resolution of the print data is converted, the print data is further corrected in the printer as shown in 704 of FIG. 7 so as to obtain smooth curves and smooth slanting lines. The above operation is called smoothing.

The simplest smoothing processing is to divide data in the print buffer 25b into blocks of i×j bits, compare them to patterns of i×j bits prestored in ROM, and apply predetermined corrections to the divided data if the divided data matches one of the patterns. Thus, in the smoothing processing, processes of comparison and correction are repeatedly performed for each of the plurality of patterns.

In the above conventional embodiment, however, when resolution conversion is performed, the print data is unconditionally subjected to smoothing processing; therefore, it takes a considerable time to perform smoothing processing, thus resulting in decreasing of throughput of the printer.

Taking into consideration that an increase in throughput of a printer is highly required as performance and processing speed of a host improve, low throughput of a printer is a considerable problem.

SUMMARY OF THE INVENTION

Accordingly, it is an object of the present invention to provide a printer and printing control method for improving throughput by performing efficient smoothing processing.

According to one aspect of the present invention, the foregoing object is attained by providing a printing apparatus performing printing on a printing medium using a printhead having a plurality of print elements, the apparatus comprising: scanning means for reciprocally scanning with the printhead; conveyance means for conveying the printing medium in a direction perpendicular to a scanning direction of the scanning means; input means for inputting print data of pixels arranged in the scanning direction of the scanning means; resolution conversion means for converting a resolution of the print data inputted by the input means; smoothing means for applying smoothing processing to the print data whose resolution was converted by the resolution conversion means; row-column conversion means for converting an order of the print data inputted by the input means into the direction of an arrangement of the print elements of the printhead; and control means for controlling execution of the row-column conversion means and/or the smoothing means in accordance with a content of the print data inputted by the input means.

The apparatus may further includes analysis means for analyzing in groups of a predetermined amount of the print data inputted by the input means to determine whether or not the print data causes print operation of the printhead, wherein the control means performs the control on the basis of an analyzed result by the analysis means.

The apparatus may further includes a receiving buffer for temporarily storing the print data inputted by the input means; and a print buffer for temporarily storing the print data for printing performed by the printhead, and in which case, it is preferred to have transmission means for transmitting the print data from the receiving buffer to the print buffer.

The analysis means preferably analyzes the print data by a unit corresponding to an area to be printed in one scanning operation of the printhead while the transmission means transmits the print data. Further, the control means controls to skip execution of the row-column conversion means and/or the smoothing means in a case where the entire print data corresponding to the area to be printed in the one scanning operation of the printhead does not cause print operation of the printhead.

Further, according to an aspect of the present invention, the apparatus may further comprises determination means for determining whether or not an image to be printed in accordance with the print data inputted by the input means is a natural image or artistic image, wherein the control means performs the control on the basis of a determination result by the determination means. In this case, when it is determined that a natural picture or an artistic picture is to be printed in a specific area, the control means controls to skip execution of the smoothing means on the print data corresponding to the specific area.

The plurality of print elements of the printhead are preferably arranged in the direction perpendicular or diagonal to the scanning direction of the scanning means.

Further, the resolution conversion means preferably converts a resolution of the print data inputted by the input means into print data of a higher resolution.

Furthermore, the printhead is preferably an ink-jet printhead which performs printing by discharging ink, and the printhead has an electrothermal transducer for generating thermal energy to be applied to ink for discharging the ink using the thermal energy.

According to another aspect of the present invention, the foregoing object is attained by providing a printing control method of reciprocally scanning with a printhead having a plurality of print elements and printing on a printing medium conveyed in the direction perpendicular to the scanning direction, the method comprising: an input step of inputting print data of pixels arranged in a scanning direction; a resolution conversion step of converting a resolution of the print data inputted at the input step; a smoothing step of applying smoothing processing to the print data whose resolution was converted at the resolution conversion step; a row-column conversion step of converting an order of the input print data into a direction of an arrangement of the print elements of the printhead; and a control step of controlling execution of the row-column conversion step and/or the smoothing step in accordance with a content of the print data inputted at the input step.

The aforesaid method may further includes an analysis step of analyzing in groups of a predetermined amount of the print data inputted at the input step by a predetermined amount to determine whether or not the print data causes print operation of the printhead, wherein the control step performs the control on the basis of an analyzed result by the analysis step.

Alternatively, the method may further includes a determination step of determining whether or not an image to be printed in accordance with the print data inputted at the input step is a natural image or artistic image, wherein the control step performs the control on the basis of a determination result by the determination step.

In accordance with the present invention as described above, whether or not input print data causes print operation by a printhead is analyzed by a predetermined data amount or whether or not the print data is a natural picture or artistic picture is discriminated, for instance, and execution of smoothing processing to print data, obtained by performing row-column conversion and resolution conversion on the input print data, is controlled in accordance with the results of the analysis or the discrimination.

According to still another aspect of the present invention, the foregoing object is attained by providing a printing apparatus for printing on a printing medium by using a printhead having a plurality of print elements, comprising: input means for inputting print data having a predetermined resolution; resolution conversion means for converting the resolution of the print data; smoothing means for applying smoothing processing to the print data by adding supplementary data generated based on print data causing actual print operation by the printhead, to the print data whose resolution was converted by the resolution conversion means; and control means for controlling execution of the smoothing means in accordance with a content of the print data inputted by the input means.

According to still another aspect of the present invention, the foregoing object is attained by providing a printing control method of printing on a printing medium by using a printhead having a plurality of print elements, the method comprising: an input step of inputting print data having a predetermined resolution; a resolution conversion step of converting a resolution of the inputted print data; a determination step of determining whether or not smoothing processing is applied to the print data whose resolution was converted at the resolution conversion step, based on a content of the inputted print data; and a smoothing step of, if it is determined at the determination step that the smoothing processing is applied, applying the smoothing processing to the print data by adding supplementary data generated based on print data causing actual print operation by the printhead, to the print data whose resolution was converted at the resolution conversion step.

The invention is particularly advantageous since, when there is no print data which causes print operation in a predetermined amount of data or when input print data is of a natural picture or artistic picture, row-column conversion and smoothing processing are skipped, thus, it is possible to perform efficient row-column conversion and smoothing processing. Accordingly, it is possible to improve throughput in printing processing.

Other features and advantages of the present invention will be apparent from the following description taken in the conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Preferred embodiments of the present invention will now be described in detail in accordance with the accompanying drawings.

Figure 1:
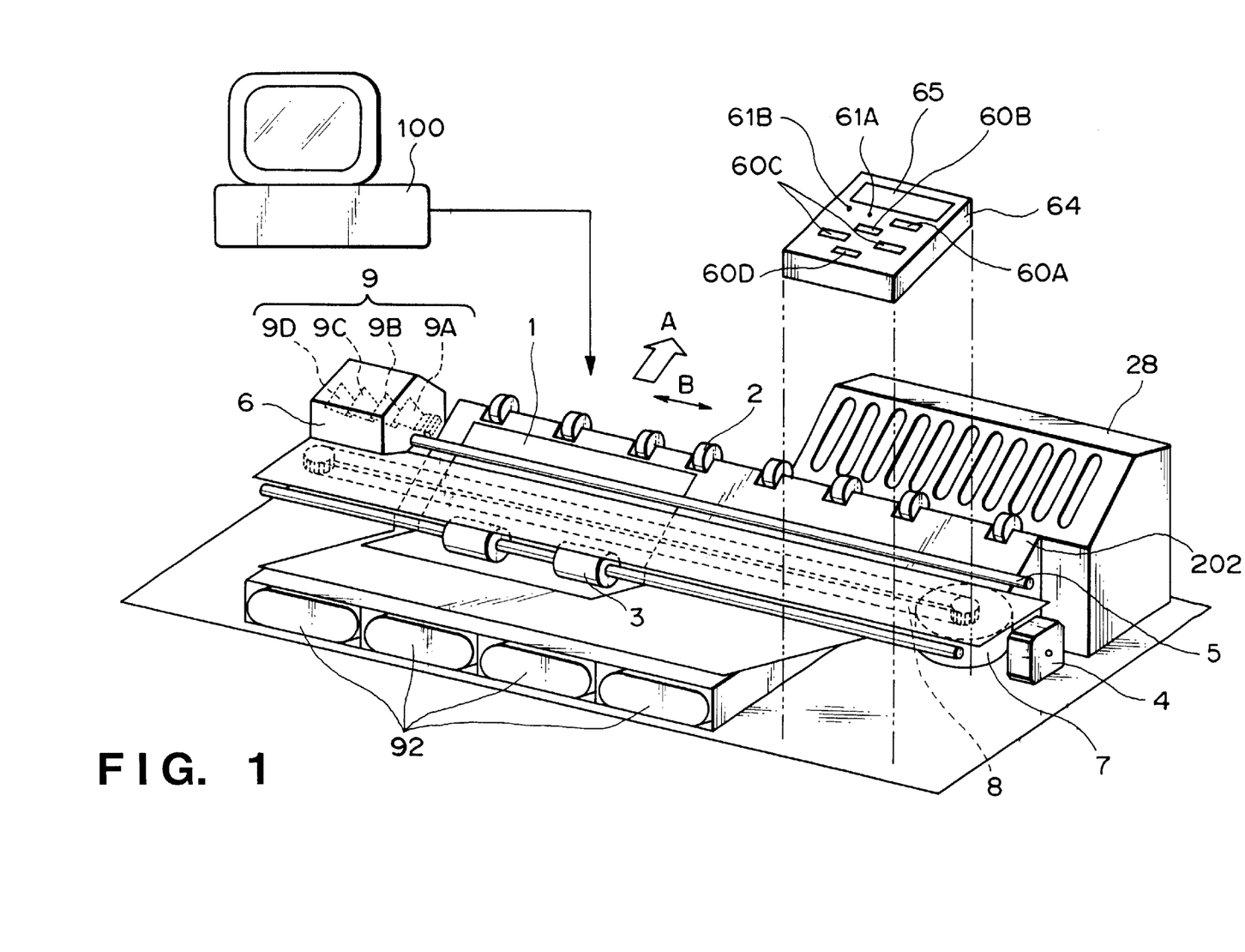
FIG. 1 is an external perspective view showing a construction of a printer, which is a typical embodiment of the present invention, equipped with printheads for performing printing in accordance with ink-jet printing method.

FIG. 1 is an external perspective view showing the construction of a printer, which is a typical embodiment of the present invention, equipped with printheads for performing printing in accordance with ink-jet printing method.

As shown in FIG. 1, the printer includes convey rollers 2, 3, which are arranged above and below a printing area at which printing paper (or other printing medium such as a plastic sheet) 1 is printed on, for conveying the printing paper 1 in the direction of an arrow A, a sheet feed motor 4 for driving the convey rollers 2, 3, a guide shaft 5 situated between the convey rollers 2 and 3 and provided in parallel with the rotary shafts of the convey rollers 2, 3, a carriage 6 moved back and forth (in the directions of arrow B) along the guide shaft 5, a carriage motor 7 for moving the carriage 6, and a belt 8 for transmitting the driving force of the carriage motor 7 to the carriage 6.

Mounted on the carriage 6 are printheads 9A~9D which perform printing by discharging ink droplets in accordance with an ink-jet printing method. (Since the printheads 9A~9D have the identical structure as shown in FIG. 5, when the four printheads are referred to collectively, the term "printhead 9" will be used.)

The printhead 9, which is for printing color images, comprises the four printheads, namely the printhead (Bk-head) 9A, the printhead (C-head) 9B, the printhead (M-head) 9C and the printhead (Y-head) 9D arranged along the scanning direction of the carriage 6 and provided so as to correspond to inks of the colors black (Bk), cyan (C), magenta (M), and yellow (Y), respectively. A plurality (e.g. 48, 64 or 128) of ink discharge orifices are arranged in a vertical row, in a direction which diagonally or vertically intersects the scanning direction of the carriage 6, on the front side of each of the printheads 9A~9D, namely on the side that opposes the printing surface of the printing paper from across a prescribed distance (e.g., 0.8 mm). The logic circuits of the printheads 9A~9D are identically constructed.

Further, a control panel 64 mounted on the external case (not shown) of the printer is provided with keys such as an online/offline changeover key 60A, a line feed key 60B, a printing mode changeover key 60C and a reset key 60D, LED lamps such as an alarm lamp 61A and power supply lamp 61B, and an LCD 65 for displaying various messages.

The printer further includes an ink tank 92 which stores ink for printing a desired image on the printing paper. The ink tank 92 includes four ink compartments which store inks of four colors [black (Bk), cyan (C), magenta (M) and yellow (Y)] corresponding to the printheads 9A, 9B, 9C and 9D, respectively. Further, reference numeral 202 denotes a platen.

As will be described below in greater detail, a controller which includes the printer CPU and accompanying components such as a ROM and RAM receives command signals and data signals (printing information) from a host computer (referred to as a "host" below), drives various motors based upon these signals and applies driving power (heating power) to electrothermal transducers (heaters) included in the printheads 9A~9D, whereby the transducers are energized.

Figure 2:
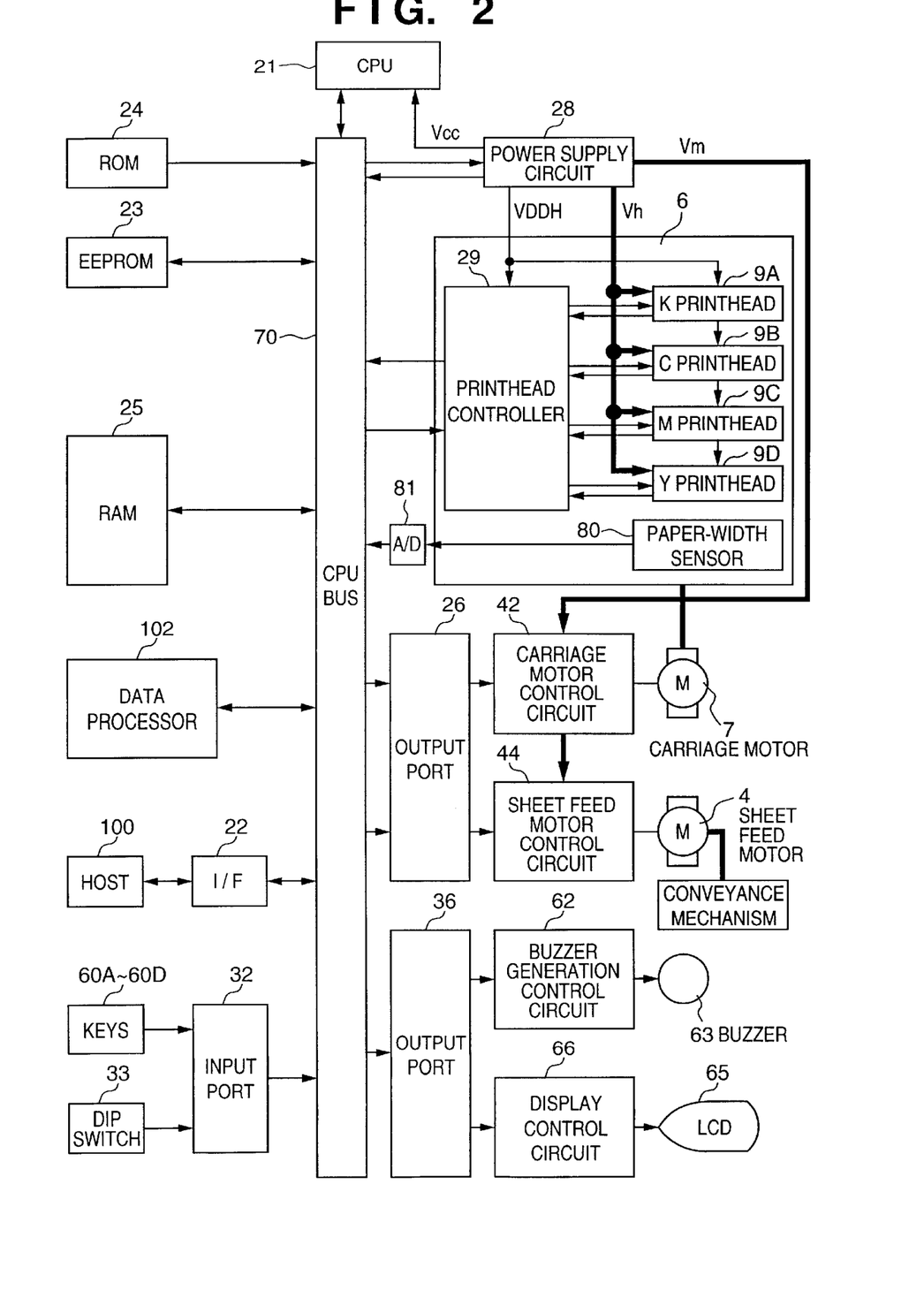
FIG. 2 is a block diagram showing a configuration of control circuitry in the printer illustrated in FIG. 1.

FIG. 2 is a block diagram showing the configuration of control circuitry in the printer illustrated in FIG. 1.

The control circuitry includes a CPU 21 of microprocessor form connected to a host 100 via an interface 22. The CPU 21 accesses a ROM 24 storing a control program, an EEPROM 23 storing an updatable control program, a processing program and data representing various constants and a RAM 25 for storing a command signal and a printing information signal received from the host 100 via an interface 22, and controls the printing operation based upon information that has been stored in these memories.

The processing executed in accordance with the above processing program includes a process of transmitting raster print data, received via the interface 22 and stored in a receiving buffer, to a print buffer of the RAM 25, a process of converting the order of the print data stored in the print buffer in consideration of the arrangement of print elements of the printhead 9 (R-C conversion), a process of transmitting print data bitmapped in a work area of the RAM 25 to the print head controller 29, a process of resolution conversion to be performed on low resolution print data (e.g., 300 dpi) received from the host 100 and bitmapped in the work area of the RAM 25 (e.g., 300 dpi to 600 dpi), and a smoothing-process of removing jaggedness.

The CPU 21 operates the carriage motor 7 via an output port 26 and carriage motor control circuit 42 to thereby move the carriage 6, and operates the sheet feed motor 4 via the output port 26 and sheet feed motor control circuit 44 to thereby operate a conveyance mechanism which includes the convey rollers 2, 3. Further, the CPU 21 drives the printheads 9A~9D via a printhead control circuit 29 based upon the printing information that has been stored in the RAM 25, thereby making it possible to print a desired image on the printing paper 1.

A power supply circuit 28 outputs a logic drive voltage Vcc (e.g. 5 V) for operating the CPU 21, a voltage Vm (e.g. 30 V) for driving the various motors, a heating voltage Vh (e.g. 25 V) for driving the printhead 9, and a back-up voltage VDDH for protecting the printhead 9. The heating voltage is applied to the printhead 9 and the back-up voltage VDDH is applied to the printhead control circuit 29 and printhead 9.

Signals from the keys 60A~60D are sent to the CPU 21 via an input port 32. When an instruction from the CPU 21 is sent to a buzzer generation control circuit 62 via an output port 36, a buzzer 63 make sounds. When an instruction from the CPU 21 is sent to a display control circuit 66 via the output port 36, a message is displayed on the LCD 65.

Note, in FIG. 2, reference numeral 33 denotes a DIP switch, provided on, e.g., the bottom part of the exterior of the printer, for transferring its output to the CPU 21 via the input port 32; 70, a CPU bus for connecting a variety of configuring elements to each other; 80, a paper-width sensor, provided in the printhead 9, for detecting width of the printing medium 1; 81, an A/D converter for converting an analog signal from the paper-width sensor 80 into a digital signal; and 102, the data processor. The CPU bus 70 includes an address bus used for transmitting/receiving an address for data access and a data bus used for data transmission.

The receiving buffer and the print buffer are provided in the RAM 25, and the CPU 21 uses the data processor 102 to perform R-C conversion, resolution conversion, and smoothing processing while accessing to the receiving buffer, print buffer and work area, provided in the RAM 25.

Figure 3:
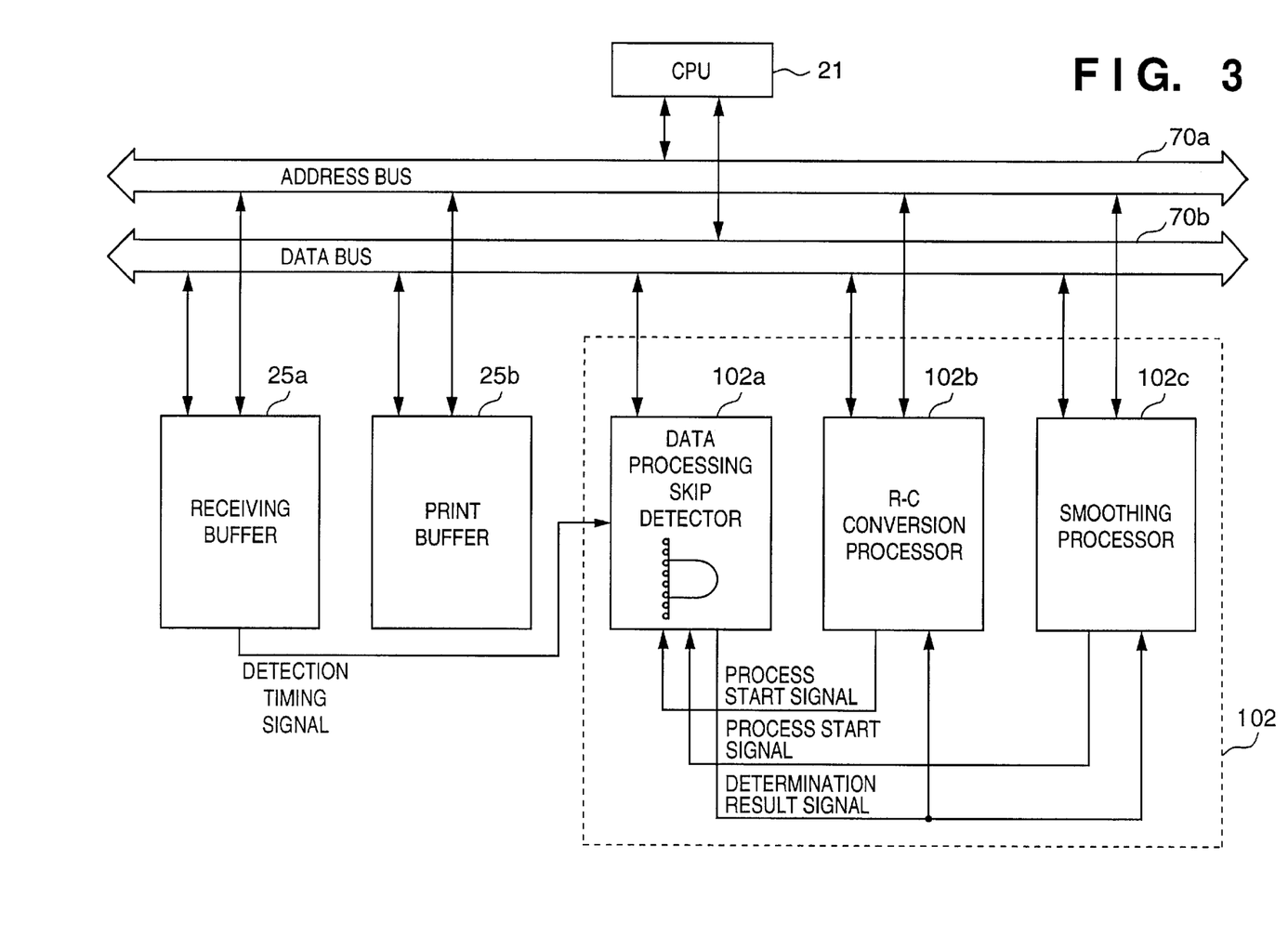
FIG. 3 is a block diagram illustrating a configuration of the data processor 102 and its configuring elements, and showing relationship with a receiving buffer, print buffer, and CPU 21.

FIG. 3 is a block diagram illustrating a configuration of the data processor 102 and its configuring elements, and showing relationship with the receiving buffer, the print buffer, and the CPU 21.

As shown in FIG. 3, the data processor 102 includes a data processing skip detector 102a for determining whether to perform or skip the subsequent R-C conversion and smoothing processing on the basis of the input print data, an R-C conversion processor 102b, and a smoothing processor 102c. A determination result by the data processing skip detector 102a is inputted to the R-C conversion processor 102b and the smoothing processor 102c as a determination result signal.

Further, the receiving buffer 25a and the print buffer 25b, both provided in the RAM 25, the data processing skip detector 102a, the R-C conversion processor 102b and the smoothing processor 102c are connected to the CPU 21 and to each other via the address bus 70a and the data bus 70b.

When print data is transmitted from the receiving buffer 25a to the print buffer 25b, a detection timing signal is transmitted from the receiving buffer 25a to the data processing skip detector 102a. Further, when the R-C conversion processor 102b and the smoothing processor 102c start respective processes, they transmit process start signals to the data processing skip detector 102a.

Figure 4:
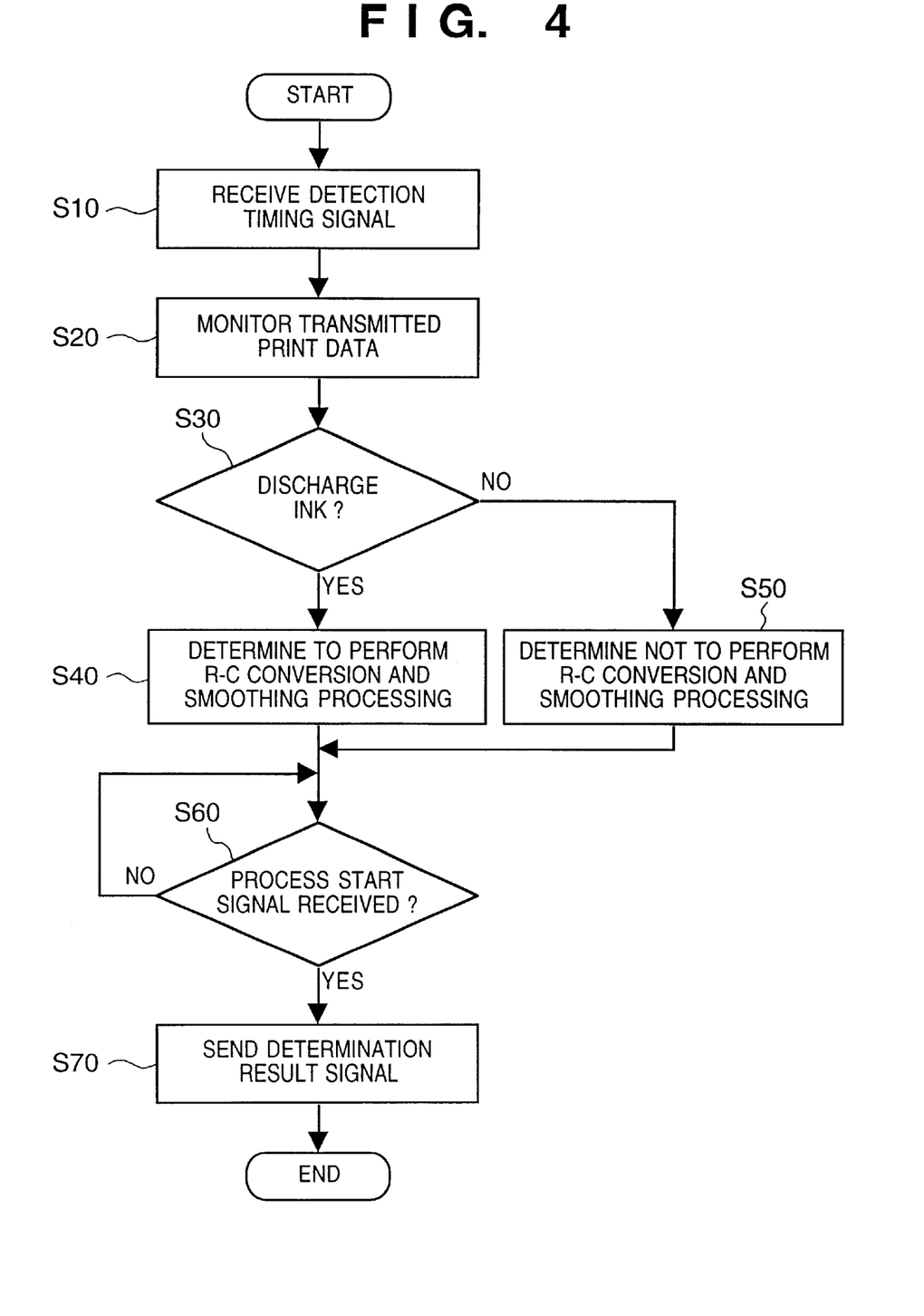
FIG. 4 is a flowchart showing execution control of row-column conversion and smoothing processing.

Next, execution control of R-C conversion and smoothing processing in the printer having the configuration as described above is explained with reference to a flowchart shown in FIG. 4.

First in step S10, when transmitting print data from the receiving buffer 25a to the print buffer 25b, the data processing skip detector 102a receives a detection timing signal from the receiving buffer 25a. Then, the data processing skip detector 102a monitors the transmitted print data in step S20, and checks whether or not data which does not cause ink discharge from the printhead 9 (called "0" data) is included in the transmitted print data corresponding to, e.g., an area to be printed in one scanning operation of the printhead 9 (one scanning printing area) in step S30.

If it is determined that all the data corresponding to the one scanning printing area is not "0", the process proceeds to step S40 where it is determined that R-C conversion and smoothing processing are to be performed in the area, and determination information indicative of it is stored. On the contrary, if it is determined that all the data corresponding to the one scanning printing area is "0", the process proceeds to step S50 where it is determined that R-C conversion and smoothing processing are not to be performed for the area, and determination information indicative of it is stored. After either step S40 or S50, the process proceeds to step S60.

In step S60, the data processing skip detector 102a waits a process start signal or signals from the R-C conversion processor 102b and/or the smoothing processor 102c. When the data processing skip detector 102a receives the process start signal or signals, then the process proceeds to step S70. In step S70, the data processing skip detector 102a transmits a determination result signal indicative of determination information obtained either in step S40 or S50 to the R-C conversion processor 102b and/or the smoothing processor 102c, and the process is completed.

Thereafter, the R-C conversion processor 102b and/or the smoothing processor 102c executes R-C conversion and/or smoothing processing in accordance with the received determination result signal. If the determination result signal indicates not to perform processing, then processing is not performed in the R-C conversion processor 102b and/or the smoothing processor 102c. In other words, the R-C conversion processor 102b and/or the smoothing processor 102c performs processing only when execution of processing is designated.

Therefore, according to the embodiment as described above, execution of R-C conversion and smoothing processing is controlled in accordance with print data; accordingly, the processings are not performed in vain, thereby it is possible to prevent a decrease in throughput caused by performing unnecessary R-C conversion and smoothing processing. In this manner, unnecessary load on the CPU is removed, which contributes to an increase in throughput in printing operation.

Note, in the above embodiment, when all the printing information in a predetermined area (e.g., one scanning printing area) does not require ink discharge, R-C conversion and the smoothing processing are omitted; however, the present invention is not limited to this, and it is possible to control to skip smoothing processing when all the print data in a predetermined area is a natural picture or artistic picture, for instance.

The determination of an image in a specific area being a natural picture or artistic picture is performed on the basis of a command transmitted from a host, or by analyzing continuity of density values of consecutive pixels or density distribution of an area on the basis of print data transmitted from the host and judging whether or not the print data is of a natural picture or artistic picture on the basis of the continuity/discontinuity and the density distribution, since densities of consecutive pixels of a natural picture or artistic picture change continuously or density distribution of an area is broad. Note that the DIP switch 33 may be used for instructing whether the determination is based on the command from the host or data analysis in a printer.

Further, a droplet discharged from the printhead is explained as an ink droplet, and liquid stored in the ink tank is explained as ink in the above embodiment, however, the present invention is not limited to ink. For example, processed liquid to be discharged toward a printing medium for improving stability, water-resistance, and quality of an image may be stored in the ink tank.

In the above-embodiment, the execution of R-C conversion processing and smoothing processing is controlled based on the content of input print data. However, it goes without saying that the present invention includes a case where either the R-C conversion processing or the smoothing processing may be skipped based on the content of print data. In this case, if the high load processing is skipped, this skip greatly contributes to improving apparatus' throughput. Also, in a printing apparatus which employs a full-line type printhead in which a plurality of printing elements are arrayed along with an entire width of a printing medium, it is not necessary to perform the above-described R-C conversion processing. In this printing apparatus, only the smoothing may be skipped based on printing data.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type printing apparatus and a continuous type printing apparatus. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copying machine, facsimile machine). Furthermore, it goes without saying that the invention is applicable also to a case where the object of the present invention can be achieved by supplying a memory medium which stores program codes for realizing the functions of the aforesaid embodiment to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for supplying the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus performing printing on a printing medium using a printhead having a plurality of print elements, said apparatus comprising:

scanning means for reciprocally scanning with the printhead;

conveyance means for conveying the printing medium in a direction perpendicular to a scanning direction of said scanning means;

input means for inputting print data of pixels arranged in the scanning direction of said scanning means;

resolution conversion means for converting a resolution of the print data inputted by said input means;

smoothing means for applying smoothing processing to the print data whose resolution was converted by said resolution conversion means;

row-column conversion means for converting an order of the print data inputted by said input means into a direction of an arrangement of the print elements of the printhead;

analysis means for analyzing in groups of a predetermined amount of print data corresponding to a predetermined printing area to determine whether or not the predetermined amount of print data causes a print operation of the printhead; and control means for controlling execution of at least one of said row-column conversion means and said smoothing means in accordance with an analyzed result by said analysis means, wherein, in a case where the predetermined amount of print data does not cause a print operation of the printhead, said control means suppresses the execution of the at least one of said row-column conversion means and said smoothing means on the predetermined amount of print data.

2. The apparatus according to claim 1, further comprising:

a receiving buffer for temporarily storing the print data inputted by said input means; and a print buffer for temporarily storing the print data for printing performed by the printhead.

3. The apparatus according to claim 2, further comprising transmission means for transmitting the print data from said receiving buffer to said print buffer.

4. The apparatus according to claim 3, wherein said analysis means analyzes the print data by a unit corresponding to an area to be printed in one scanning operation of the printhead while said transmission means transmits the print data.

5. The apparatus according to claim 4, wherein said control means controls to skip execution of at least one of said row-column conversion means and said smoothing means in a case where the entire print data corresponding to the area to be printed in the one scanning operation of the printhead does not cause print operation of the printhead.

6. The apparatus according to claim 1, further comprising determination means for determining whether or not an image to be printed in accordance with the print data inputted by said input means is a photographic image or a non-photographic image, wherein said control means performs the control on the basis of a determination result by said determination means.

7. The apparatus according to claim 6, wherein, when it is determined that a photographic picture or a non-photographic picture is to be printed in a specific area, said control means controls to skip execution of said smoothing means on the print data corresponding to the specific area.

8. The apparatus according to claim 1, wherein the plurality of print elements of the printhead are arranged in the direction perpendicular or diagonal to the scanning direction of said scanning means.

9. The apparatus according to claim 1, wherein said resolution conversion means converts a resolution of the print data inputted by said input means into print data of a higher resolution.

10. The apparatus according to claim 1, wherein the printhead is an ink-jet printhead which performs printing by discharging ink.

11. The apparatus according to claim 10, wherein the printhead has an electrothermal transducer for generating thermal energy to be applied to ink for discharging the ink using the thermal energy.

12. The apparatus according to claim 1, wherein, if it is analyzed by said analysis means that the predetermined amount of print data does not cause a print operation of the printhead, said control means suppresses the execution of both said row-column conversion means and said smoothing means on the predetermined amount of print data.

13. A printing control method of reciprocally scanning with a printhead having a plurality of print elements and printing on a printing medium conveyed in the direction perpendicular to the scanning direction, said method comprising:

an input step of inputting print data of pixels arranged in a scanning direction;

a resolution conversion step of converting a resolution of the print data inputted at said input step;

a smoothing step of applying smoothing processing to the print data whose resolution was converted at said resolution conversion step;

a row-column conversion step of converting an order of the input print data into a direction of an arrangement of the print elements of the printhead;

an analysis step of analyzing in groups of a predetermined amount of print data corresponding to a predetermined printed area to determine whether or not the predetermined amount of print data causes a print operation of the printhead; and a control step of controlling execution of at least one of said row-column conversion step and said smoothing step in accordance with an analyzed result by said analysis step, wherein, in a case where the predetermined amount of print data does not cause a print operation of the printhead, said control step suppresses the execution of the at least one of said row-column conversion step and said smoothing step on the predetermined amount of print data.

14. The method according to claim 13, further comprising a determination step of determining whether or not an image to be printed in accordance with the print data inputted at said input step is a photographic image or a non-photographic image, wherein said control step performs the control on the basis of a determination result by said determination step.

15. The method according to claim 13, wherein, if it is analyzed by said analysis step that the predetermined amount of print data does not cause a print operation of the printhead, said control step suppresses the execution of both said row-column conversion step and said smoothing step on the predetermined amount of print data.

16. A printing apparatus for printing on a printing medium by using a printhead having a plurality of print elements, comprising:

input means for inputting print data having a predetermined resolution;

resolution conversion means for converting the resolution of the print data;

smoothing means for applying smoothing processing to the print data by adding supplementary data generated based on print data causing actual print operation by said printhead, to the print data whose resolution was converted by said resolution conversion means;

analysis means for analyzing in groups of a predetermined amount of print data corresponding to a predetermined printed area to determine whether or not the predetermined amount of print data causes a print operation of the printhead; and control means for controlling execution of said smoothing means in accordance with an analyzed result by said analysis means, wherein, if the predetermined amount of print data does not cause a print operation of the printhead, said control means suppresses the execution of said smoothing means on the predetermined amount of print data.

17. The apparatus according to claim 16, further comprising:

a receiving buffer for temporarily storing the print data inputted by said input means; and a print buffer for temporarily storing the print data for printing performed by the printhead.

18. The apparatus according to claim 17, further comprising transmission means for transmitting the print data from said receiving buffer to said print buffer.

19. The apparatus according to claim 18, wherein said analysis means analyzes the print data by a unit corresponding to an area to be printed in one scanning operation of the printhead while said transmission means transmits the print data.

20. The apparatus according to claim 19, wherein said control means controls to skip execution of said smoothing means in a case where the entire print data corresponding to the area to be printed in the one scanning operation of the printhead does not cause print operation of the printhead.

21. The apparatus according to claim 16, further comprising determination means for determining whether or not an image to be printed in accordance with the print data inputted by said input means is a photographic image or a non-photographic image, wherein said control means performs the control on the basis of a determination result by said determination means.

22. The apparatus according to claim 21, wherein, when it is determined that a photographic picture or a non-photographic picture is to be printed in a specific area, said control means controls to skip execution of said smoothing means on the print data corresponding to the specific area.

23. The apparatus according to claim 16, wherein said resolution conversion means converts a resolution of the print data inputted by said input means into print data of a higher resolution.

24. The apparatus according to claim 16, wherein the printhead is an ink-jet printhead which performs printing by discharging ink.

25. The apparatus according to claim 24, wherein the printhead has an electrothermal transducer for generating thermal energy to be applied to ink for discharging the ink using the thermal energy.

26. A printing control method of printing on a printing medium by using a printhead having a plurality of print elements, said method comprising:

- an input step of inputting print data having a predetermined resolution;
- a resolution conversion step of converting a resolution of the inputted print data;
- an analysis step of analyzing in groups of a predetermined amount of print data corresponding to a predetermined printed area to determine whether or not the predetermined amount of print data causes a print operation of the printhead;
- a determination step of determining whether or not smoothing processing is applied to the print data whose resolution was converted at said resolution conversion step, based on an analyzed result by said analysis step; and
- a smoothing step of, if it is determined at said determination step that the smoothing processing is applied, applying the smoothing processing to the print data by adding supplementary data generated based on print data causing actual print operation by said printhead, to the print data whose resolution was converted at said resolution conversion step, wherein, if the predetermined amount of print data does not cause a print operation of the printhead, execution of the smoothing processing on the predetermined amount of print data is suppressed.

27. The method according to claim 26, further comprising a discrimination step of discriminating whether or not an image to be printed in accordance with the print data inputted at said input step is a photographic image or a non-photographic image, wherein execution of the smoothing processing is controlled on the basis of a discrimination result by said discrimination step.

* * * * *

UNITED STATES PATENT AND TRADEMARK OFFICE
CERTIFICATE OF CORRECTION

PATENT NO. : 6,328,401 B1  Page 1 of 1
DATED : December 11, 2001
INVENTOR(S) : Akira Kuronuma et al.

It is certified that error appears in the above-identified patent and that said Letters Patent is hereby corrected as shown below:

<u>Title page,</u>
Item [57], ABSTRACT,
Line 5, "analyses" should read -- analyzes --; and
Line 6, "whether" should read -- to determine whether --.

<u>Column 2,</u>
Line 8, "(honrizontal)" should read -- (horizontal) --; and
Line 11, "corresponding" should read -- correspondence --.

<u>Column 3,</u>
Line 11, "includes" should read -- include --;
Line 17, "includes" should read -- include --; and
Line 34, "comprises" should read -- comprise --.

<u>Column 4,</u>
Line 6, "includes" should read -- include --;
Line 13, "includes" should read -- include --.

<u>Column 7,</u>
Line 26, "to" should be deleted.

<u>Column 8,</u>
Line 19, "waits" should read -- waits for --.

Signed and Sealed this

Ninth Day of July, 2002

*Attest:*

*Attesting Officer*

JAMES E. ROGAN
*Director of the United States Patent and Trademark Office*